United States Patent
Holmqvist et al.

(10) Patent No.: US 12,552,411 B2
(45) Date of Patent: Feb. 17, 2026

(54) METHOD FOR CHECKING A CONTROL DEVICE OF A REMOTE DRIVING STATION

(71) Applicant: Einride AB, Stockholm (SE)

(72) Inventors: Sebastian Holmqvist, Stockholm (SE); Simon Andersson, Stockholm (SE); Per Hallgren, Stockholm (SE); Alexandre Thenorio, Stockholm (SE)

(73) Assignee: Einride AB, Stockholm (SE)

( * ) Notice: Subject to any disclaimer, the term of this patent is extended or adjusted under 35 U.S.C. 154(b) by 176 days.

(21) Appl. No.: 18/319,848

(22) Filed: May 18, 2023

(65) Prior Publication Data
US 2023/0373528 A1 Nov. 23, 2023

(30) Foreign Application Priority Data
May 18, 2022 (EP) .................................. 22174121

(51) Int. Cl.
*B60W 60/00* (2020.01)
*G05B 23/02* (2006.01)
*G07C 5/00* (2006.01)
*H04L 43/0852* (2022.01)
*G05D 1/00* (2024.01)

(52) U.S. Cl.
CPC ..... *B60W 60/0015* (2020.02); *G05B 23/0259* (2013.01); *G07C 5/008* (2013.01); *H04L 43/0852* (2013.01); *B60W 2556/45* (2020.02); *G05D 1/0016* (2013.01)

(58) Field of Classification Search
CPC .......... B60W 60/0015; B60W 2556/45; G05B 23/0259; H04L 43/0852; G05D 1/0016
See application file for complete search history.

(56) References Cited

U.S. PATENT DOCUMENTS

| | | | |
|---|---|---|---|
| 10,740,988 B2 * | 8/2020 | Liu | G05D 1/224 |
| 11,242,066 B2 | 2/2022 | Choi | |
| 2011/0277030 A1 * | 11/2011 | Gillespie | G06F 21/34 726/17 |
| 2020/0283007 A1 * | 9/2020 | Choi | B60W 50/029 |
| 2020/0356651 A1 * | 11/2020 | Yen | B60W 40/08 |
| 2020/0401126 A1 * | 12/2020 | Cermak | G05D 1/0022 |
| 2021/0078595 A1 * | 3/2021 | Magzimof | G08G 1/20 |
| 2023/0138112 A1 * | 5/2023 | Gross | G05D 1/0038 701/24 |

OTHER PUBLICATIONS

European Search Report and Written Opinion dated Oct. 24, 2022 issued in EP 22174121.8.

* cited by examiner

*Primary Examiner* — Scott A Browne
*Assistant Examiner* — Izcalli Rios-Aguirre
(74) *Attorney, Agent, or Firm* — SCULLY, SCOTT, MURPHY & PRESSER, P.C.

(57) ABSTRACT

A method including sending a challenge from a vehicle to a remote driving station, wherein the challenge causes an input device control unit to apply at least one output signal to a circuitry; receiving in the vehicle a response from the remote driving station, wherein the response indicates at least one input signal received by the input device control unit from the circuitry in response to the applied at least one output signal; and determining, by a vehicle control unit of the vehicle, at least one of the state of a manually operable input device and whether the circuitry is faulty based on the sent challenge and the received response.

17 Claims, 7 Drawing Sheets

METHOD FOR CHECKING A CONTROL DEVICE OF A REMOTE DRIVING STATION

CROSS-REFERENCE TO RELATED APPLICATION

This application claims priority to European Patent Application No. EP 22174121, filed on May 18, 2022. The disclosure of European Patent Application No. EP 22174121 is incorporated by reference herein.

TECHNICAL FIELD OF THE INVENTION

The present invention relates to a method for checking a control device of a remote driving station. The present invention also relates to a vehicle and a system.

BACKGROUND OF THE INVENTION

Teleoperation of an (otherwise) autonomous vehicle has been proposed. The Applicant of the present application, Einride Aft has for example demonstrated a 5G-connected transportation solution wherein a human user can teleoperate Einride's autonomous, all-electric, cab-less truck ("Pod"). That is, the user can remotely drive the truck from a remote location relative to the truck.

SUMMARY OF THE INVENTION

In order for a driver to safely remote drive a road legal vehicle from a remote driving station, safe controls from the remote driving station to the vehicle are required. Furthermore, for the vehicle to be considered independently safe, it needs to validate the integrity of the controls.

It is (therefore) an object of the invention to provide a method for checking a control device of a remote driving station.

According to a first aspect of the present invention, there is provided a method in a vehicle for checking a control device of a remote driving station, wherein the control device is used for remote operation of the vehicle by an operator of the remote driving station, wherein the control device comprises a manually operable input device having at least a first state and a second state, an input device control unit, and circuitry connecting the manually operable input device and the input device control unit, wherein the method comprises sending a challenge from the vehicle to the remote driving station in a first data package, wherein the challenge is configured to cause the input device control unit to apply at least one output signal to said circuitry, receiving in the vehicle a response from the remote driving station in a second data package, wherein the response indicates at least one input signal received by the input device control unit from said circuitry in response to the at least one output signal, and determining, by a vehicle control unit of the vehicle, at least one of the state of the manually operable input device and whether said circuitry is faulty based on the sent challenge and the received response.

The present invention is at least partly based on the understanding that by issuing a challenge from the vehicle to the remote driving station and evaluating the response sent back, the state and any faultiness, by which it is meant physical integrity, of the control device can effectively be evaluated (determined) by the vehicle alone, whereby the vehicle may be considered independently safe. That is, the remote driving station is in the present method treated as an observer, probe or proxy, effectively unaware of the expected results, whereby safety requirements may be removed from the remote driving station, or reduced for it, providing a technical advantage.

In one embodiment, in the first state of the manually operable input device, the manually operable input device is not actuated by the operator and propulsion of the vehicle as remotely operated by the operator from the remote driving station is not allowed, wherein in the second state of the manually operable input device, the manually operable input device is actuated by the operator and propulsion of the vehicle as remotely operated by the operator from the remote driving station is allowed, and wherein the manually operable input device is adapted to automatically return from the second state to the first state when the operator stops actuating the manually operable input device. This control device may help ensure that the vehicle is not accidentally remotely driven by the operator, like a dead man's switch. Hence, it is an essential control device for the vehicle to check. Alternatively, the second state could send a confirmation to the vehicle by the operator just monitoring the otherwise autonomously driving vehicle, whereas in the first state no such confirmation is sent. The manually operable input device may here for example be a biased pushbutton or a pedal, that springs back from the second state to the first state when released by the operator.

In another embodiment, in the first state of the manually operable input device, the manually operable input device is not actuated by the operator and the vehicle is not caused to perform an emergency stop, and wherein the second state of the manually operable input device is an active state caused by actuation of the manually operable input device by the operator, in which second state the vehicle is caused to autonomously perform an emergency stop, like a kill switch. Hence, it is an essential control device for the vehicle to check. The manually operable input device may here for example be a non-biased pushbutton, that maintains the second state once actuated.

The challenge may be sent in a first data package, which first data package further includes a timestamp generated by the vehicle control unit when the challenge is sent from the vehicle, wherein the response is received in a second data package, which second data package further includes said timestamp, and wherein the vehicle control unit compares the timestamp and the current time when the second data package is received to determine any latency in communication between the vehicle and the remote driving station. In this way, the vehicle may ensure that the control device in the remote driving station works in a timely manner, to further improve safety.

The challenge may be sent in a first data package, which first data package further includes a vehicle unique identifier, wherein the response is received in a second data package, which second data package further includes a vehicle unique identifier (which should be the same as the vehicle unique identifier of the first data package), and wherein the vehicle control unit determines whether or not the vehicle unique identifier of the first data package matches the vehicle unique identifier of the second data package. In this way, the vehicle may ensure that the challenge/response origin is correct, to further improve safety.

The vehicle control unit may calculate a first checksum based on the vehicle unique identifier, the timestamp, the challenge, and an expected response of the first data package, which first checksum is appended to the first data package and included in the second data package, calculate a second checksum based on the vehicle unique identifier, the timestamp, the challenge, and the response of the second data package, and determine if the first checksum of the second data package is the same as the calculated second checksum.

The circuitry may comprise two independent and parallel circuits, wherein a first circuit of the two independent and parallel circuits includes a first switch operable by the manually operable input device, which first switch is normally closed when the manually operable input device is in the first state, and wherein a second circuit of the two independent and parallel circuits includes a second switch operable by the manually operable input device, which second switch is normally open when the manually operable input device is in the first state. Two independent circuits may increase the integrity of the manually operable input device state. Furthermore, by having a normally closed switch in one of the circuits and a normally open switch in the other, both the first state and the second state of the manually operable input device can be safely determined by the vehicle.

The challenge may cause the input device control unit to apply a high signal level to the first circuit and a high signal level to the second circuit, wherein the vehicle control unit determines at least one of: that the circuitry is faulty if (in response to) the response indicates a low signal level from the first circuit and a low signal level from the second circuit; that the manually operable input device is in the first state if the response indicates a high signal level from the first circuit and a low signal level from the second circuit; that the manually operable input device is in the second state if the response indicates a low signal level from the first circuit and a high signal level from the second circuit; and that the circuitry is faulty if the response indicates a high signal level from the first circuit and a high signal level from the second circuit.

A 'high signal level' can for example be one (1) and a 'low signal level' may for example be zero (0), in case said at least one output/input signal is at least one digital signal/test pulse. Alternatively, a 'high signal level' can be within a first range of (higher) voltage levels and a 'low signal level' can be within a second range of (lower) voltage levels, for example.

For the "dead man's switch" embodiment, determining that the manually operable input device is in the first state means that that manually operable input device is released and no propulsion of the vehicle as remotely operated by the operator from the remote driving station is allowed, whereas determining that the manually operable input device is in the second state means that that the manually operable input device is depressed and propulsion of the vehicle as remotely operated by the operator from the remote driving station is allowed. Propulsion of the vehicle as remotely operated by the operator from the remote driving station may also be disallowed if the vehicle control unit determines that the circuitry is faulty (e.g. shorted or open).

For the "kill switch" embodiment, determining that the manually operable input device is in the first state means that that manually operable input device is released and the vehicle is not caused to perform an emergency stop, whereas determining that the manually operable input device is in the second state means that that manually operable input device is depressed and the vehicle is caused to autonomously perform an emergency stop. The vehicle may also autonomously perform an emergency stop if the vehicle control unit determines that the circuitry is faulty (e.g. shorted or open).

The vehicle may send high/high as a challenge many times over, for example between 10-100 Hz (to achieve a reaction time in the range of 10 to 100 ms), to allow the vehicle to detect if the "dead man's switch" manually operable input device is depressed (or something else is wrong) och if the "kill switch" manually operable input device is released (or something else is wrong), thereby ensuring safe remote operation of the vehicle.

A further challenge may cause the input device control unit to apply a low signal level to the first circuit and a high signal level to the second circuit, wherein the vehicle control unit determines that the first circuit is short circuited if the response indicates a high signal level from the first circuit. That is, the challenge low/high ensures that the first circuit with the normally closed first switch is not SC to HIGH.

Another challenge may cause the input device control unit to apply a high signal level to the first circuit and a low signal level to the second circuit, wherein the vehicle control unit determines that the second circuit is short circuited if the response indicates a high signal level from the second circuit. That is, the challenge high/low ensures that the second circuit with the normally open second switch is not SC to HIGH.

The vehicle may alternate between sending a high/low challenge (single test pulse) and a low/high challenge (single test pulse), for example every few seconds, in order for the vehicle to detect short circuit (SC) to high, i.e. that a short circuit (=fault) causes a high response rather than a closed switch. In other words, the vehicle may send low as a challenge to allow the vehicle to detect if there is a short circuit or other faults that causes the input device control unit to read a voltage higher than a threshold for a high signal.

The manually operable input device must preferably be cycled (e.g. depressed/released by the operator) and the vehicle control unit must determine both the first state and the second state of the manually operable input device at the start of a driving session of the vehicle before driving of the vehicle is allowed. In this way, the vehicle may ensure that no latent hardware faults are present.

The vehicle may be at least one of: capable of autonomous driving and remote driving (but not local manual driving), capable of fully electric propulsion, and a road vehicle, like the Einride Pod.

According to a second aspect of the present invention, there is provided a vehicle configured to perform the method according to the first aspect.

According to a third aspect of the present invention, there is provided a system, comprising: a remote driving station including at least one control device for remote operation of a vehicle by an operator of the remote driving station, wherein the control device comprises a manually operable input device having at least a first state and a second state, an input device control unit, and circuitry connecting the manually operable input device and the input device control unit; and a vehicle including wireless communication means and a vehicle control unit, wherein the vehicle control unit is configured to: send a challenge (DO) via the wireless communication means to the remote driving station, wherein the challenge causes the input device control unit to apply at least one output signal to said circuitry; receive via the wireless communication means a response (DI) from the remote driving station, wherein the response indicates at least one input signal received by the input device control unit from said circuitry in response to the applied at least one output signal: and determine at least one of the state of the manually operable input device and whether said circuitry is faulty based on the sent challenge and the received response. This aspect may exhibit the same or similar feature and technical effects as the first and/or second aspect, and vice versa.

The at least one control device may include a dead man's switch allowing/disallowing propulsion of the vehicle as remotely operated by the operator from the remote driving station and a kill switch causing the vehicle to autonomously perform an emergency stop.

Embodiments of the present disclosure also comprise computer programs configured to cause methods as disclosed herein to be performed, when run. Such computer programs may be embodied on a non-transient medium, for example.

BRIEF DESCRIPTION OF THE DRAWINGS

These and other aspects of the present invention will now be described in more detail, with reference to the appended drawings showing exemplary embodiments of the present invention.

DETAILED DESCRIPTION

In the following detailed description, some embodiments of the present invention will be described. However, it is to be understood that features of the different embodiments are exchangeable between the embodiments and may be combined in different ways, unless anything else is specifically indicated. Even though in the following description, numerous details are set forth to provide a more thorough understanding of the present invention, it will be apparent to one skilled in the art that the present invention may be practiced without these details. In other instances, well known constructions or functions are not described in detail, so as not to obscure the present invention.

Figure 1A:
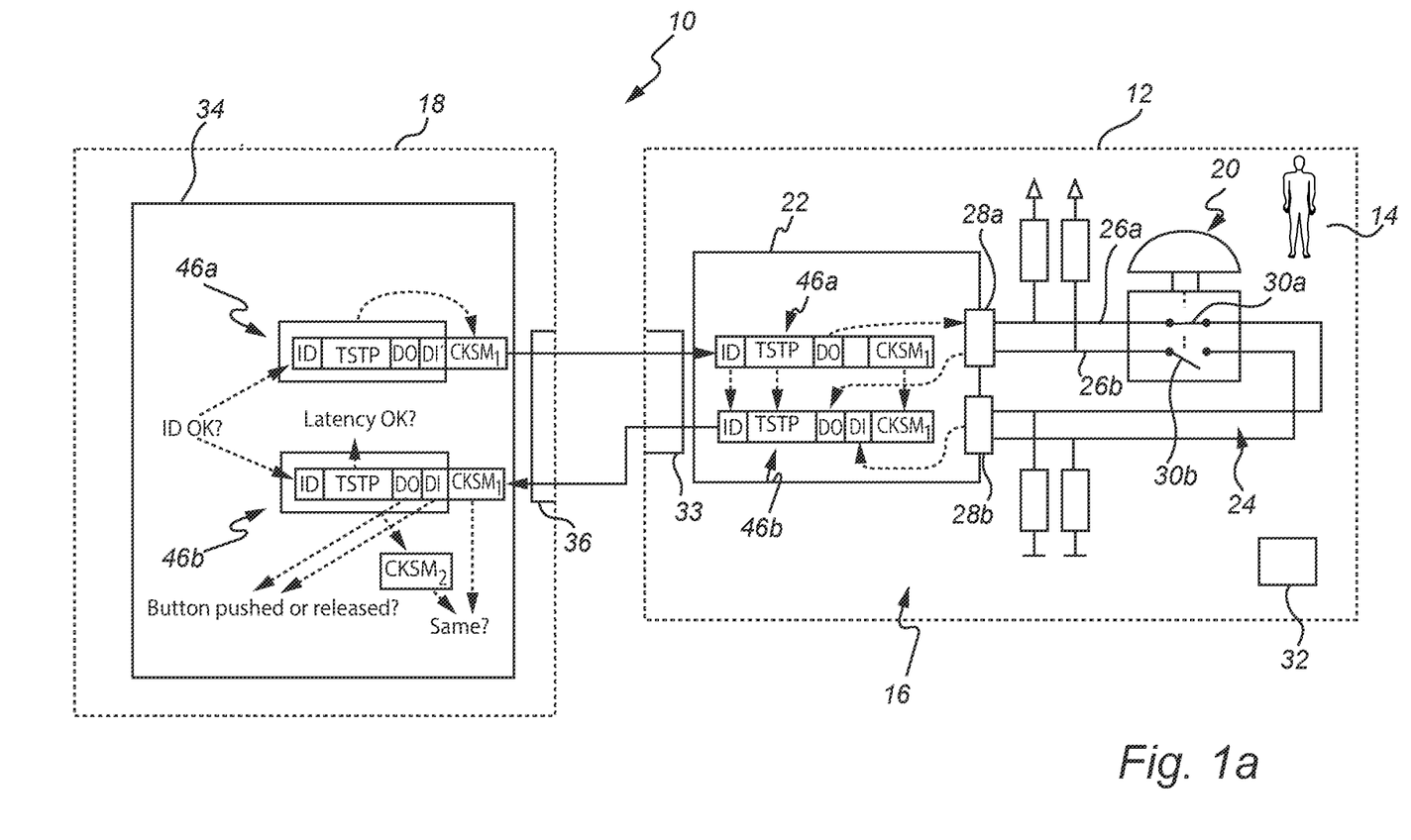
FIGS. 1a-b schematically show a system according an aspect of the present invention.
Figure 1B:
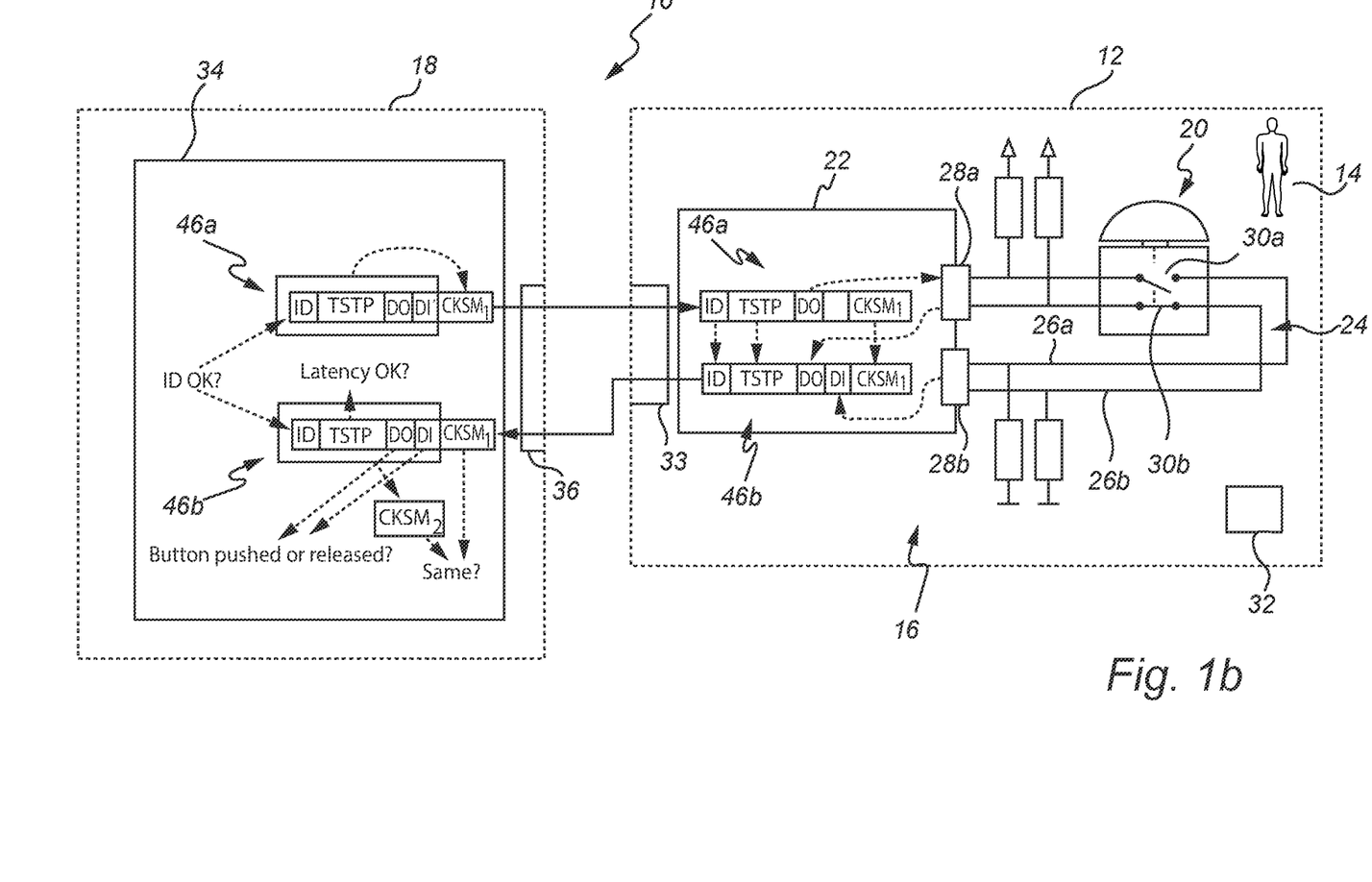

FIGS. 1a-b schematically shows a system 10 according an aspect of the present invention.

The system 10 comprises a remote driving station 12. The remote driving station 12 may accommodate at least one (tele)operator 14. The remote driving station 12 includes at least one control device 16 for remote operation of a vehicle 18 by the operator 14.

The control device 16 comprises a manually operable input device 20, an input device control unit 22, and circuitry 24 connecting the manually operable input device 20 and the input device control unit 22.

The manually operable input device 20 may have at least a first state (FIG. 1a) and a second state (FIG. 1b). The manually operable input device 20 may for example be a go button or a dead man's switch, which in the first state is not actuated (pushed) by the operator 14, whereby propulsion of the vehicle 18 as remotely operated by the operator 14 from the remote driving station 12 is not allowed. In the second state, this manually operable input device 20 is actuated (pushed) by the operator 14, whereby propulsion of the vehicle 18 is allowed. Furthermore, this manually operable input device 20 may be adapted to automatically return from the second state to the first state when the operator 14 stops actuating (pushing) the manually operable input device 22. The manually operable input device 20 may here be a biased pushbutton or a pedal, that springs back from the second state to the first state when released by the operator 14.

Alternatively, manually operable input device 20 may be a(n emergency) stop button or kill switch, which in the first state is not actuated (pushed) by the operator 14, whereby the vehicle 18 is not caused to perform an emergency stop. In the second state, this manually operable input device 20 is an active state (pushed down) caused by actuation of the manually operable input device 20 by the operator 14, whereby the vehicle 18 is caused to autonomously perform an emergency stop. The manually operable input device 20 may here be a non-biased pushbutton, that maintains the second state once actuated (pushed).

The remote driving station 12 will typically have both a go button manually operable input device 20 and a stop button manually operable input device 20, each with an associated input device control unit 22 and circuitry 24. Alternatively, one input device control unit 22 could serve both manually operable input devices 20.

The circuitry 24 may comprise two independent and parallel circuits 26a-b. Each circuit 26a-b connects the manually operable input device 20 to an output 28a and an input 28b of the input device control unit 22, as shown in FIGS. 1a-b. A first circuit 26a of the circuits 26a-b may include a first switch 30a operable by the manually operable input device 20. The first switch 30a may be normally closed (NC) when the manually operable input device 20 is in the first state (FIG. 1a), and open when the manually operable input device 22 is in the second state (FIG. 1b). A second circuit 26b of the circuits 26a-b may include a second switch 30b operable by the manually operable input device 20. The second switch 30b may be normally open (NO) when the manually operable input device 20 is in the first state (FIG. 1a), and closed when the manually operable input device 20 is in the second state (FIG. 1b).

The remote operation station 12 may comprises further equipment 32 for allowing the operator 14 to remotely assist and/or drive the vehicle 18 and other such vehicles. The equipment 32 may include one or more screens for showing the surroundings of the vehicle 18 (as detected by the sensors 38, see FIG. 2), a steering wheel, throttle, braking means, etc. The remote operation station 12 may also have communication means 33 for wirelessly communicating with the vehicle 18.

Figure 2:
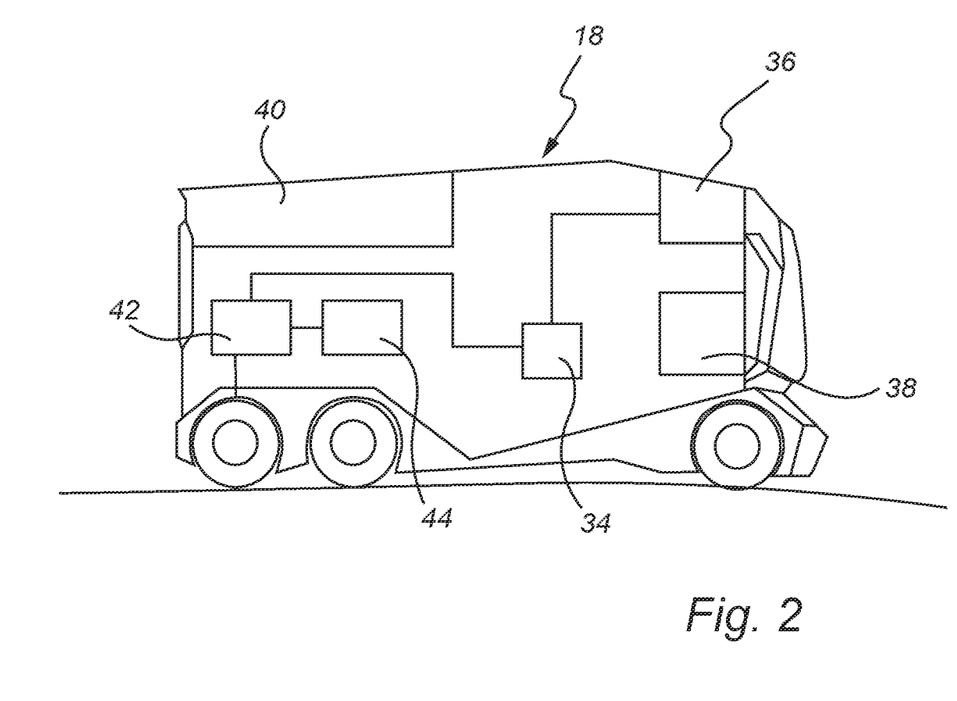
FIG. 2 schematically shows a vehicle according to one or more embodiments of the present invention.

Turning to FIG. 2, the vehicle 18 includes a vehicle control unit (VCU) 34. The vehicle further includes wireless communication means 36 (e.g. 5G), to communicate with the remote operation station 12. The vehicle 18 should be capable of autonomous driving and remote driving. To this end, the vehicle 18 may have several different driving modes that the vehicle 18 can switch between. The driving modes may include a fully autonomous driving mode (no human input), at least one driving mode that requires that the human operator 14 assists the vehicle 18 (wherein the operator 14 monitors and/or confirms otherwise autonomous driving), and a fully remote driving mode (wherein the operator 14 drives the autonomous/remotely operated vehicle 18 from the remote operation station 12). The vehicle 18 may further comprise various sensors 38 to detect its surroundings. The vehicle 18 is typically a (wheeled) road vehicle. The vehicle 18 may for example be a transport vehicle, with a cargo area 40 for pallets, timber, perishable goods, etc. Furthermore, the vehicle 18 may be an all-electric vehicle, propelled by at least one electric motor 42 powered by a battery 44. That is, the vehicle 18 could be referred to an electric truck. The vehicle 18 may also be devoid of a driver's cab, thereby it cannot be driven manually by a driver in the vehicle 10.

In order for the operator 14 to safely remote drive the vehicle 18 from the remote driving station 12, safe controls from the remote driving station 12 to the vehicle 18 are required. Furthermore, for the vehicle 18 to be considered independently safe, it needs to validate the integrity of the controls, in particular the at least one control device 16.

Figure 3:
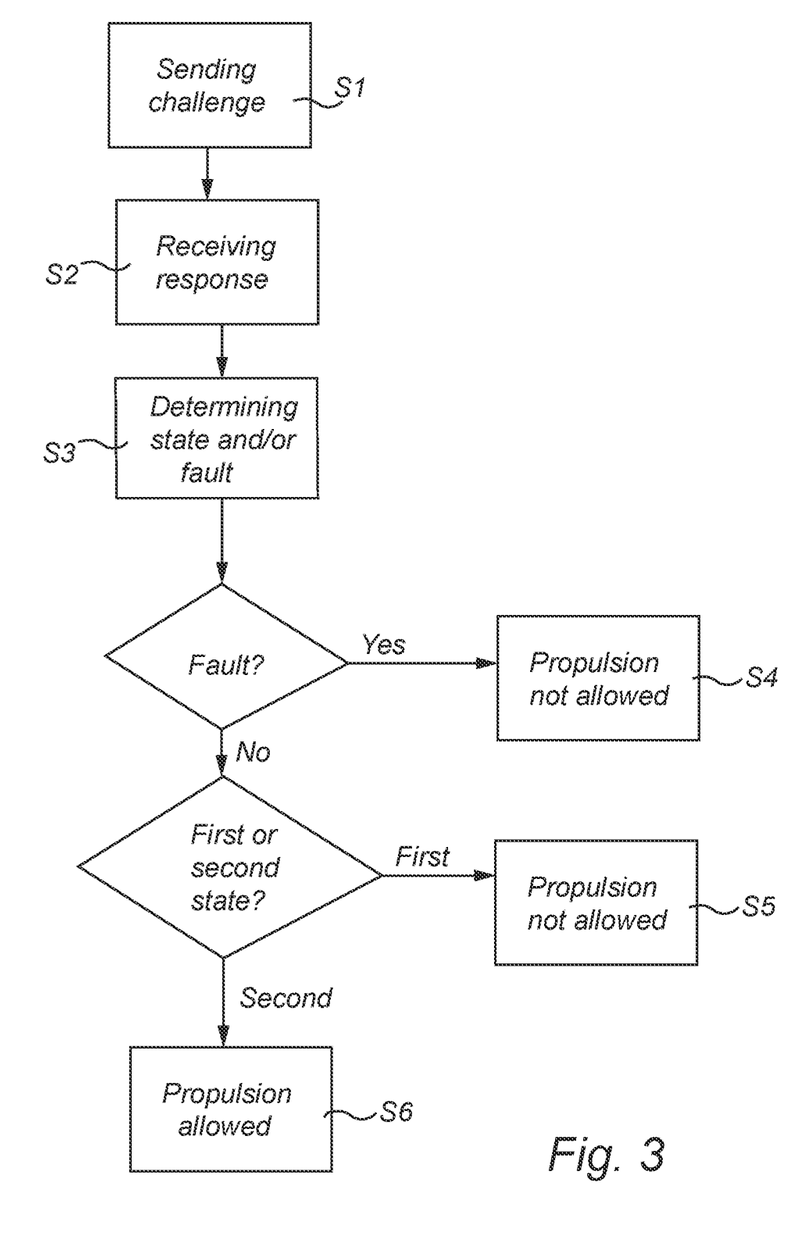
FIG. 3 is flowchart of a method according an embodiment of the present invention.
Figure 4:
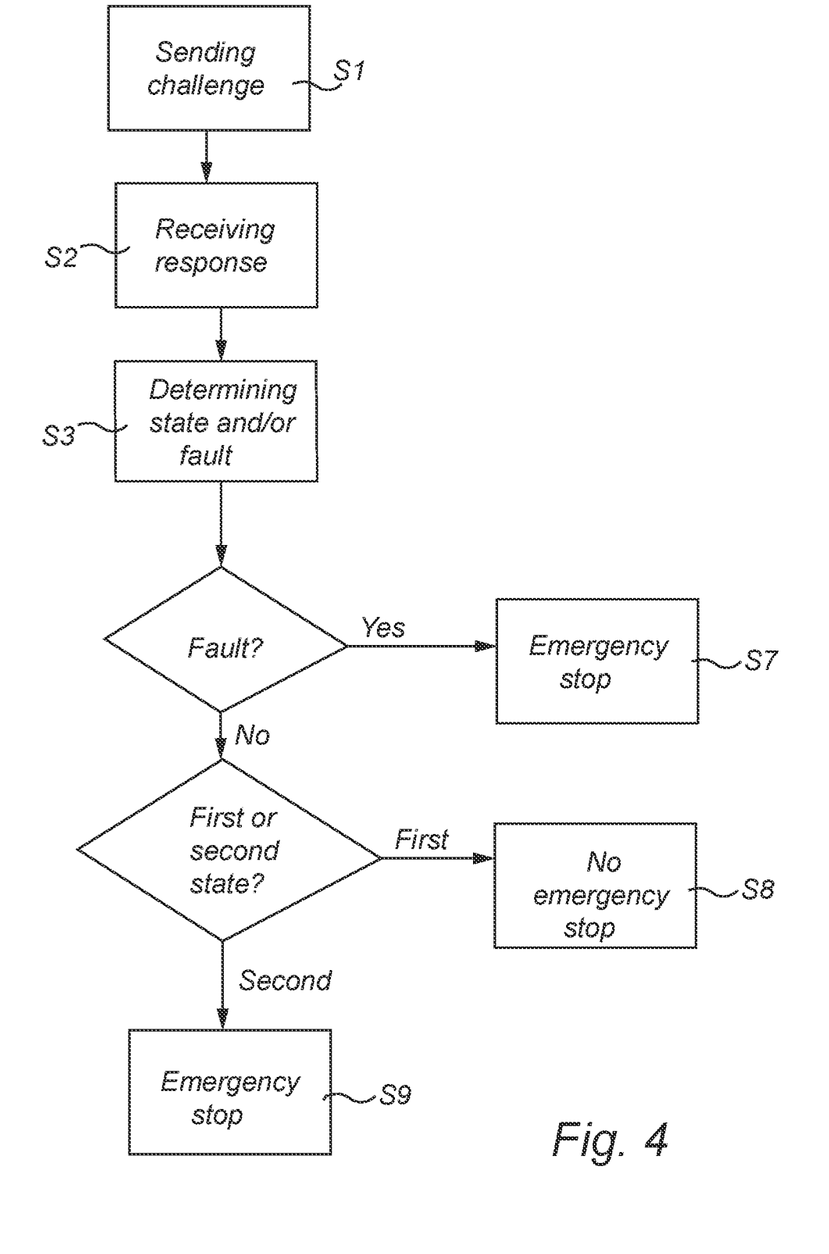
FIG. 4 is flowchart of a method according another embodiment of the present invention.

To this end, FIGS. 3-4 show methods for checking control device 16. In FIG. 3, the control device 16 includes the aforementioned go button/dead man's switch, and in FIG. 4 the control device 16 includes the aforementioned stop button/kill switch.

At S1, a challenge DO is sent from the vehicle 18 to the remote driving station 12. The challenge DO may be sent by the vehicle control unit 34 via the wireless communication means 36, for example, to the remote driving station 12. The challenge DO may be sent/included in a first data package 46a. The challenge DO causes the input device control unit 22 of the control device 16 to apply at least one output signal to the circuitry 24. The input device control unit 22 may also include (read back) the challenge DO to a second data package 46b.

At S2, a response DI (to the challenge DO) is received in the vehicle 18 from the remote driving station 12. The response DI may be received by the vehicle control unit 34 via the wireless communication means 36, for example. The response DI may be received/included in the second data package 46b. The response DI indicates at least one input signal received by the input device control unit 22 from the circuitry 24 of the control device 16 in response to the applied at least one output signal.

At S3, the vehicle control unit 34 determines the state (first state; FIG. 1a or second state; FIG. 1b) of the manually operable input device 22 of the control device 16 and/or whether the circuitry 24 of the control device 16 is faulty based on the sent challenge DO and the received response DI.

In more detail, one challenge DO may cause the input device control unit 22 to apply a high signal level to the first circuit 26a and a high signal level to the second circuit 26b via output 28a. A 'high signal level' can for example be one (1), and a 'low signal level' may for example be zero (0). Alternatively, a 'high signal level' can be within a first range of (higher) voltage levels and a 'low signal level' can be within a second range of (lower) voltage levels. For the high/high challenge DO, the vehicle control unit 34 may determine: that the circuitry 24 is faulty if the response DI via input 28b indicates a low signal level from the first circuit 26a and a low signal level from the second circuit 26a (the first switch 30a may for example be open even though it should be normally closed in FIG. 1a); that the manually operable input device 20 is in the first state if the response DI indicates a high signal level from the first circuit 26a and a low signal level from the second circuit 26b (corresponding to the state of FIG. 1a); that the manually operable input device 20 is in the second state if the response DI indicates a low signal level from the first circuit 26a and a high signal level from the second circuit 26b (corresponding to the state of FIG. 1b); and that the circuitry 24 is faulty if the response DI indicates a high signal level from the first circuit 26a and a high signal level from the second circuit 26b (the second switch 30b may for example be closed even though it should be normally open in FIG. 1a). The vehicle 18 may send high/high as a challenge many times over, for example between 10-100 Hz.

In FIG. 3, if the vehicle control unit 34 in S3 determines that the circuitry 24 of the control device 16 is faulty (e.g. shorted or open), propulsion of the vehicle 18 as remotely operated by the operator 14 from the remote driving station 12 is disallowed (S4). Furthermore, determining in S3 that the manually operable input device 20 is in the first state means that that the manually operable input device 20 is released, whereby no propulsion of the vehicle 18 as remotely operated by the operator 14 from the remote driving station 12 is allowed (S5). On the other hand, determining in S3 that the manually operable input device 20 is in the second state (and that the circuitry 24 is not faulty, if any faultiness of the circuitry 24 is determined at S3) means that the manually operable input device 20 is depressed, whereby propulsion of the vehicle 18 as remotely operated by the operator 14 from the remote driving station 12 is allowed (S6). A low/high response DI (to the high/high challenge DO) may here be the response expected by the vehicle 18, i.e. the go button/manually operable input device 20 is pushed/depressed.

In FIG. 4, if the vehicle control unit 34 in S3 determines that the circuitry 24 of the control device 16 is faulty (e.g. shorted or open), the vehicle 18 may autonomously perform an emergency stop (S7). Furthermore, determining in S3 that the manually operable input device 20 is in the first state (and that the circuitry 24 is not faulty, if any faultiness of the circuitry 24 is determined at S3) means that the manually operable input device 20 is released, whereby the vehicle 18 is not caused to perform an emergency stop (S8). On the other hand, determining in S3 that the manually operable input device 20 is in the second state means that that manually operable input device 20 is depressed, whereby the vehicle 18 is caused to autonomously perform an emergency stop (S9). A high/low response DI (to the high/high challenge DO) may here be the response expected by the vehicle 18, i.e. the stop button/manually operable input device 20 is released.

It is appreciated that for the vehicle 18 to be remotely operated/driven by the operator 14 from the remote driving station 12, both S6 and S8 may have to be realized. This may be referred to as an operational state of the vehicle 18.

Furthermore, as the remote driving station 12 will typically have both a go button manually operable input device 20 and a stop button manually operable input device 20, the vehicle 18 may perform both the methods of FIGS. 3-4.

In some embodiments, each manually operable input device 22 must be cycled (e.g. depressed/released by the operator) and the vehicle control unit 34 must determine both the first state and the second state of each manually operable input device 22 at the start of a driving session before driving of the vehicle 18 is allowed. Specifically, at start up of the vehicle 18, the first (passive) state may by default be evaluated in each manually operable input device 20 (go button and stop button). The go button/manually operable input device 20 should then be pushed to the second state by the operator 14 and evaluated by the vehicle control unit 34, and the stop button/manually operable input device 20 should be depressed-released and evaluated, before operations may start.

A further challenge DO may cause the input device control unit 22 to apply a low signal level to the first circuit 26a and a high signal level to the second circuit 26b. For this low/high challenge DO, the vehicle control unit 34 may determine: that the first circuit 26a is short circuited if the response DI indicates a high signal level from the first circuit 26a; and that the first circuit is not short circuited if the response indicates a low signal level from the first circuit.

Another challenge DO may cause the input device control unit 22 to apply a high signal level to the first circuit 26a and a low signal level to the second circuit 26b. For this high/low challenge DO, the vehicle control unit 34 may determine: that the second circuit 26b is short circuited if the response indicates a high signal level from the second circuit 26b; and that the second circuit 26b is not short circuited if the response indicates a low signal level from the first circuit. The vehicle 18 may alternate between sending a high/low challenge DO and a low/high challenge DO every few seconds, for example.

Various challenges and responses, as well as corresponding states of the circuitry 24 and the manually operable input devices 20 (go button and stop button) as discussed above are summarized in Table 1.

TABLE 1

| Challenge DO | | Response DI | | State of circuit 24 | State of go button 20 | Prop. | State of stop button 20 | Estop |
| --- | --- | --- | --- | --- | --- | --- | --- | --- |
| 26a | 26b | 26a | 26b | | | | | |
| High | High | Low | Low | Faulty | | No | | Yes |
| High | High | Low | High | | $2^{nd}$ state (depressed) | Yes (S6) | $2^{nd}$ state (depressed) | Yes |
| High | High | High | Low | | $1^{st}$ state (released) | No | $1^{st}$ state (released) | No (S8) |
| High | High | High | High | Faulty | | No | | No |
| Low | High | Low | Low | | Test NC | — | Test NC | — |
| Low | High | Low | High | | Test NC | — | Test NC | — |
| Low | High | High | Low | Faulty* | | No | | Yes |
| Low | High | High | High | Faulty* | | No | | Yes |
| High | Low | Low | Low | | Test NO | — | Test NO | — |
| High | Low | Low | High | Faulty** | | No | | Yes |
| High | Low | High | Low | | Test NO | — | Test NO | — |
| High | Low | High | High | Faulty** | | No | | Yes |

Prop. = propulsion of the vehicle 18 as remotely operated by the operator 14 from the remote driving station 12. Estop = emergency stop. Faulty* = first circuit 26a short circuited. Faulty** = second circuit 26b short circuited. Test NC is sending L/H to test that the first circuit 26a is able to go low independent on the second circuit 26b; the response can be either L/L or L/H without the manually operable input devices 20/circuit 24 being faulty. Test NO corresponds to Test NC but for the second circuit 26b.

Figure 5:
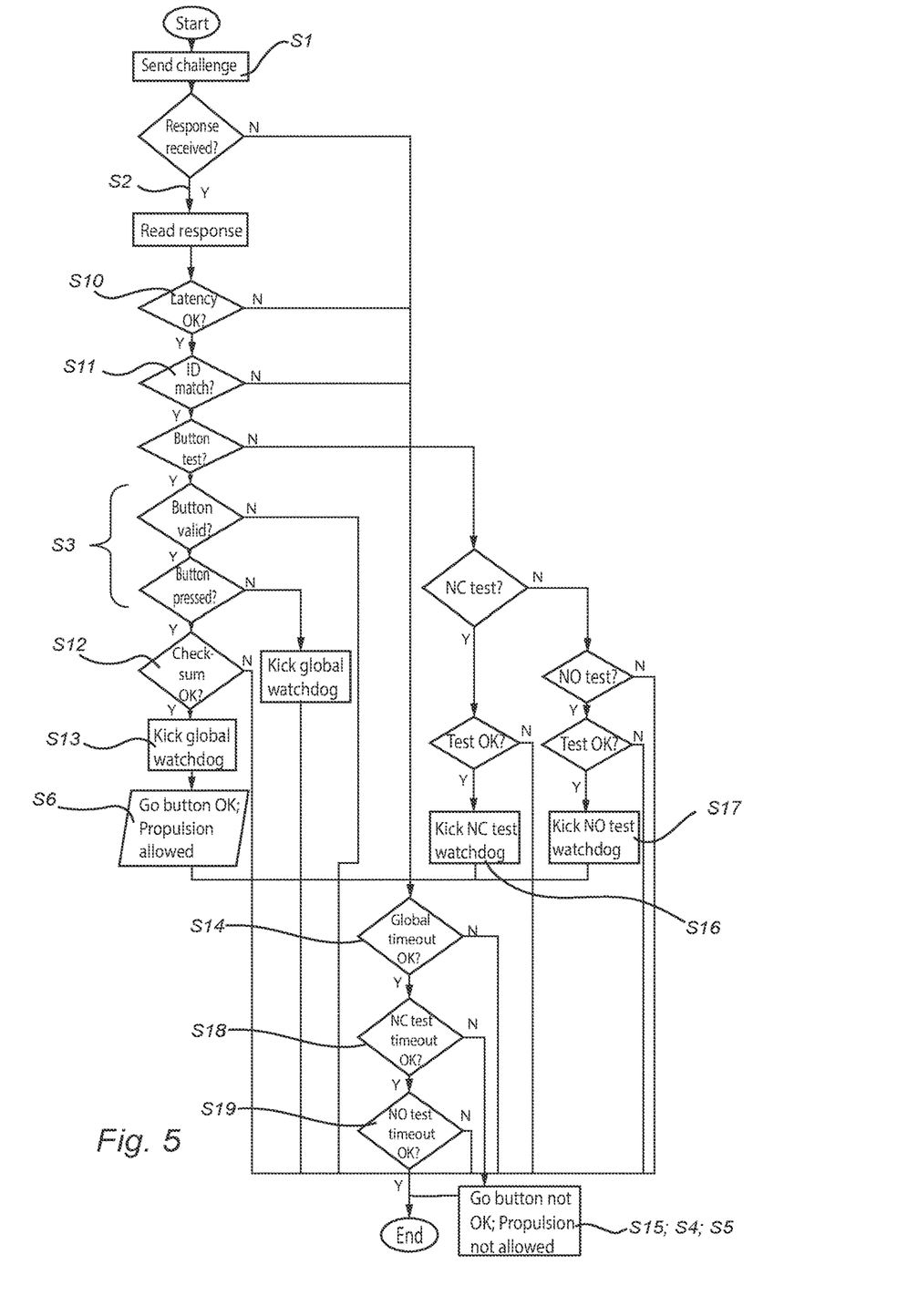
FIGS. 5-6 are flowcharts of more detailed embodiments of the method of the present invention.
Figure 6:
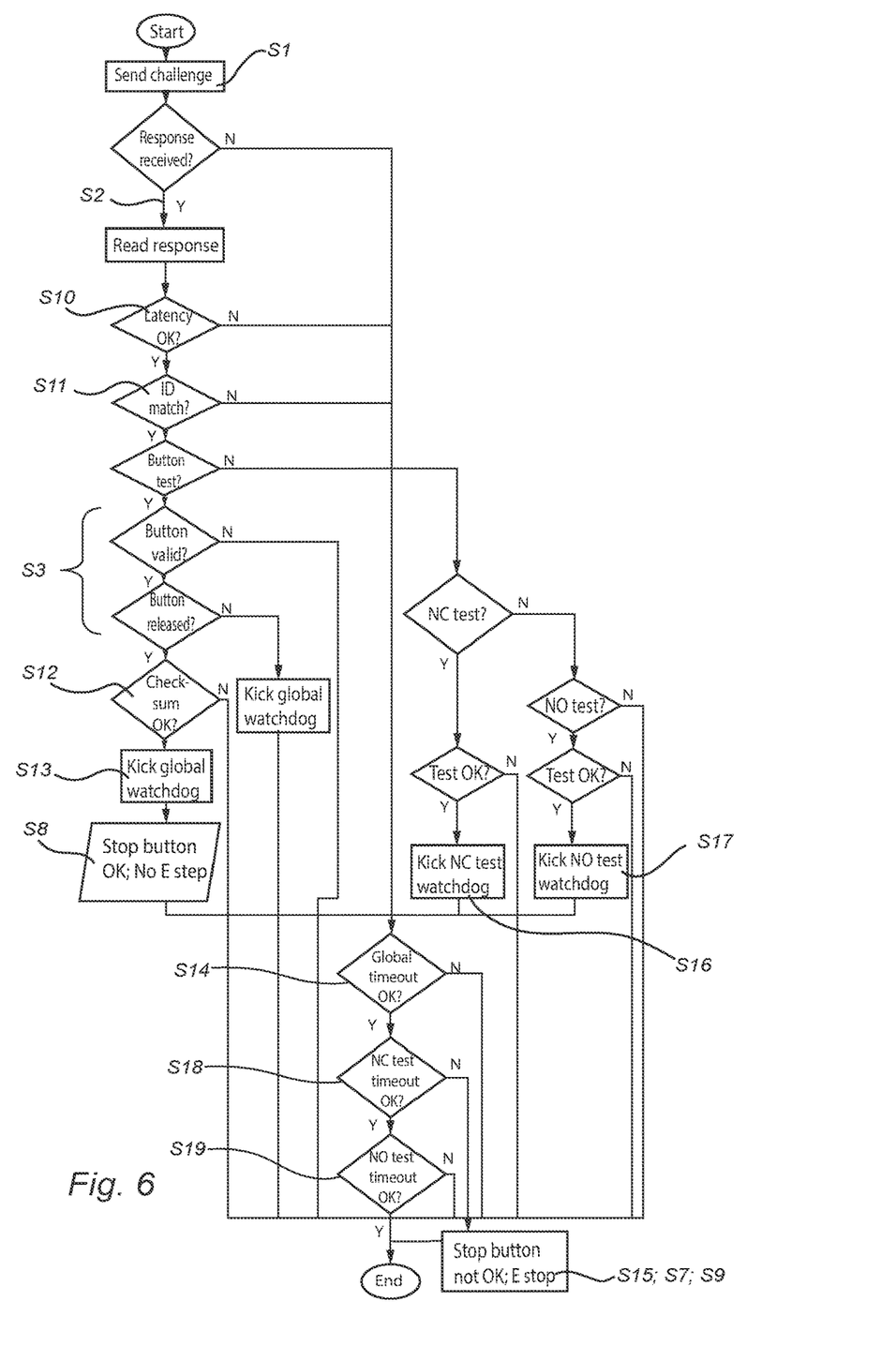

FIGS. 5-6 are flowcharts of more detailed embodiments of the method of the present invention. In FIG. 5, the control device 16 includes the aforementioned go button/dead man's switch, like in FIG. 3. In FIG. 6 the control device 16 includes the aforementioned stop button/kill switch, like in FIG. 4.

Following steps S1 and S2, the methods of FIGS. 5-6 may include determining if latency in communication between the vehicle 18 and the remote driving station 12 is ok (at S10). Namely, the first data package 46a may further include a timestamp TSTP generated by the vehicle control unit 34 when the challenge DO is sent from the vehicle 18. The timestamp TSMP may be generated using a clock of the vehicle control unit 34. The input device control unit 22 may copy the timestamp TSTP received in the first data package 46a to the second data package 46b. The vehicle control unit 34 may then compare the timestamp TSTP of the second data package 46b and the current time of said clock when the second data package 46b is received, and determine any latency in communication between the vehicle 18 and the remote driving station 12. In an example, TSTP=08:26:58: 020 (HH:MM:SS:ms) and the current time of said clock when the second data package 46b is received is 08:26:58: 030, whereby the latency is 10 ms (roundtrip). The latency may be deemed ok if it is below a (predetermined) threshold. The threshold may for example be in the range of 500-2000 ms, such as 1000 ms.

The first data package 46a may further include a vehicle unique identifier ID, i.e. an identifier unique to the vehicle 18. The input device control unit 22 may copy the vehicle unique identifier ID received in the first data package 46a to the second data package 46b. The vehicle control unit 34 may then determine (at S11, see FIGS. 5-6) whether or not the vehicle unique identifier ID of the first data package 46a matches (that is, is the same as) the vehicle unique identifier ID of the second data package 46b. In this way, the vehicle 18 may ensure that the challenge/response origin is correct.

Furthermore, the vehicle control unit 34 may calculate a first checksum $CKSM_1$ based on the vehicle unique identifier ID, timestamp TSTP, challenge DO, and a response DI' (expected by the vehicle 18) of the first data package 46a. The expected response DI' may be deleted before the first data package 46a is sent to the remote driving station 12. The first checksum $CKSM_1$ may be appended to the first data package 46a. The input device control unit 22 may copy the first checksum $CKSM_1$ to the second data package 46b. The vehicle control unit 34 may further calculate a second $CKSM_2$ based on the vehicle unique identifier ID, TSTP, challenge DO, and response DI of the second data package 46b from the remote driving station 12, and determine if the first checksum $CKSM_1$ of the second data package 46b is the same as the calculated second $CKSM_2$ (at S12, see FIGS. 5-6).

Furthermore, the vehicle control unit 34 may run a "global" watchdog that is kicked (reset) at S13 each time a valid second data package 46b comes through in response to a high/high challenge DO. And by valid is meant that the vehicle unique identifiers ID match, that latency is below the threshold, that the state of the manually operable input device 20 is correct (go button pushed and/or stop button not pressed), and that the checksums $CKSM_1$ and $CKSM_2$ match.

A timeout for the global watchdog, which timeout may be checked at S14, may for example be set to 1s. If no valid second data package 46b has been received in 1s, the vehicle 18 may default to a safe state (no propulsion and/or emergency stop performed) at S15.

The vehicle control unit 34 may also run a "test" watchdog that is kicked every time a test pulse is successful. For example, the test pulse low/high is successful if the response is low/low or low/high, whereby the NC test watchdog is kicked at S16. Likewise, the test pulse high/low is successful if the response is low/low or high/low, whereby the NO test watchdog is kicked at S17. Each "test" watchdog may have an associated timeout checked at S18 and S19, respectively.

In total, the vehicle control unit 34 may run two global watchdogs (one for the go button 20 and one for the stop button 20) and four test watchdogs (one for each circuit 26a-b in each button 20).

The skilled person in the art realizes that the present invention by no means is limited to the embodiments described above. The features of the described embodiments may be combined in different ways, and many modifications and variations are possible within the scope of the appended claims. The word "comprising" does not exclude the presence of other elements or steps than those listed in the claim. The word "a" or "an" preceding an element does not exclude the presence of a plurality of such elements.

The invention claimed is:

1. A method in a vehicle for checking a control device of a remote driving station, wherein the control device is used for remote operation of the vehicle by an operator of the remote driving station, wherein the control device comprises a manually operable input device having at least a first state and a second state, an input device control unit, and circuitry connecting the manually operable input device and the input device control unit, wherein the method comprises:
   sending a challenge from the vehicle to the remote driving station in a first data package, wherein the challenge is configured to cause the input device control unit to apply at least one output signal to said circuitry;
   receiving in the vehicle a response from the remote driving station in a second data package, wherein the response indicates at least one input signal received by the input device control unit from said circuitry in response to the at least one output signal; and
   determining, by a vehicle control unit of the vehicle, at least one of the states of the manually operable input device and whether said circuitry is faulty based on the sent challenge and the received response,
   wherein the circuitry comprises two independent and parallel circuits,
   wherein a first circuit of the two independent and parallel circuits includes a first switch operable by the manually operable input device, which first switch is normally closed when the manually operable input device is in the first state, and
   wherein a second circuit of the two independent and parallel circuits includes a second switch operable by the manually operable input device, which second switch is normally open when the manually operable input device is in the first state.

2. The method according to claim 1,
wherein in the first state of the manually operable input device, the manually operable input device is not actuated by the operator and propulsion of the vehicle as remotely operated by the operator from the remote driving station is not allowed,
wherein in the second state of the manually operable input device, the manually operable input device is actuated by the operator and propulsion of the vehicle as remotely operated by the operator from the remote driving station is allowed, and
wherein the manually operable input device is adapted to automatically return from the second state to the first state when the operator stops actuating the manually operable input device.

3. The method according to claim 1,
wherein in the first state of the manually operable input device, the manually operable input device is not actuated by the operator and the vehicle is not caused to perform an emergency stop, and
wherein the second state of the manually operable input device is an active state caused by actuation of the manually operable input device by the operator and, in which second state the vehicle is caused to autonomously perform an emergency stop.

4. The method according to claim 1,
wherein the first data package further includes a timestamp generated by the vehicle control unit when the challenge is sent from the vehicle,
wherein the second data package further includes said timestamp, and
wherein the vehicle control unit compares the timestamp and a current time when the second data package is received to determine any latency in communication between the vehicle and the remote driving station.

5. The method according to claim 4,
wherein the first data package comprises a vehicle identifier,
wherein the second data package comprises a vehicle unique identifier, and
wherein the vehicle control unit determines whether or not the vehicle identifier of the first data package matches the vehicle identifier of the second data package.

6. The method according to claim 5,
wherein the vehicle control unit calculates a first checksum based on the vehicle identifier, the timestamp, the challenge, and an expected response of the first data package, which first checksum is appended to the first data package and included in the second data package, calculates a second checksum based on the vehicle unique identifier, the timestamp, the challenge, and the response of the second data package, and determines if the first checksum of the first data package is the same as the calculated second checksum.

7. The method according to claim 1,
wherein the challenge is configured to cause the input device control unit to apply a high signal level to the first circuit and a high signal level to the second circuit, and
wherein the vehicle control unit determines based on the received response at least one of:
   that the circuitry is faulty if the response indicates a low signal level from the first circuit and a low signal level from the second circuit;
   that the manually operable input device is in the first state if the response indicates a high signal level from the first circuit and a low signal level from the second circuit;
   that the manually operable input device is in the second state if the response indicates a low signal level from the first circuit and a high signal level from the second circuit; and
   that the circuitry is faulty if the response indicates a high signal level from the first circuit and a high signal level from the second circuit.

8. The method according to claim 1,
wherein the challenge is configured to cause the input device control unit to apply a low signal level to the first circuit and a high signal level to the second circuit, and wherein the vehicle control unit determines that the first circuit is short circuited if the received response indicates a high signal level from the first circuit.

9. The method according to claim 1,
wherein the challenge is configured to cause the input device control unit to apply a high signal level to the first circuit and a low signal level to the second circuit, and
wherein the vehicle control unit determines that the second circuit is short circuited if the response indicates a high signal level from the second circuit.

10. The method according to claim 1,
wherein the manually operable input device must be cycled and the vehicle control unit must determine both the first state and the second state of the manually operable input device at the start of a driving session of the vehicle before driving of the vehicle is allowed.

11. The method according to claim 1,
wherein the vehicle is at least one of: capable of autonomous driving and remote driving, capable of fully electric propulsion, and a road vehicle.

12. A system comprising:
a remote driving station including at least one control device for remote operation of a vehicle by an operator of the remote driving station, wherein the control device comprises a manually operable input device having at least a first state and a second state, an input device control unit, and circuitry connecting the manually operable input device and the input device control unit; and
a vehicle including a vehicle control unit, wherein the vehicle control unit is configured to:
send a challenge to the remote driving station, wherein the challenge causes the input device to apply at least one output signal to said circuitry;
receive a response from the remote driving station, wherein the response indicates at least one input signal received by the input device control unit from said circuitry in response to the applied at least one output signal; and
determine at least one of the states of the manually operable input device and whether said circuitry is faulty based on the sent challenge and the received response,
wherein the circuitry comprises two independent and parallel circuits,
wherein a first circuit of the two independent and parallel circuits includes a first switch operable by the manually operable input device, which first switch is normally closed when the manually operable input device is in the first state, and
wherein a second circuit of the two independent and parallel circuits includes a second switch operable by the manually operable input device, which second switch is normally open when the manually operable input device is in the first state.

13. A non-transitory computer-readable storage medium storing a program that causes a computer to perform the following, when run:
process a first data package, received in a remote driving station from a vehicle, the first data package comprising a challenge wherein the challenge is configured to cause an input device control unit of the remote driving station to apply at least one output signal to circuitry of the remote driving station connecting a manually operable input device of the remote driving station and the input device control unit; and
provide a response to the vehicle in a second data package, wherein the response indicates at least one input signal received by the input device control unit from said circuitry in response to the at least one output signal, and wherein the challenge and the response allows a vehicle control unit of the vehicle to determine at least one of a first state and a second state of the manually operable input device,
wherein the circuitry comprises two independent and parallel circuits,
wherein a first circuit of the two independent and parallel circuits includes a first switch operable by the manually operable input device, which first switch is normally closed when the manually operable input device is in the first state, and
wherein a second circuit of the two independent and parallel circuits includes a second switch operable by the manually operable input device, which second switch is normally open when the manually operable input device is in the first state.

14. The system according to claim 12,
wherein in the first state of the manually operable input device, the manually operable input device is not actuated by the operator and propulsion of the vehicle as remotely operated by the operator from the remote driving station is not allowed,
wherein in the second state of the manually operable input device, the manually operable input device is actuated by the operator and propulsion of the vehicle as remotely operated by the operator from the remote driving station is allowed, and
wherein the manually operable input device is adapted to automatically return from the second state to the first state when the operator stops actuating the manually operable input device.

15. The system according to claim 12,
wherein the challenge is configured to cause the input device control unit to apply a high signal level to the first circuit and a high signal level to the second circuit, and
wherein the vehicle control unit determines based on the received response at least one of:
that the circuitry is faulty if the response indicates a low signal level from the first circuit and a low signal level from the second circuit;
that the manually operable input device is in the first state if the response indicates a high signal level from the first circuit and a low signal level from the second circuit;
that the manually operable input device is in the second state if the response indicates a low signal level from the first circuit and a high signal level from the second circuit; and
that the circuitry is faulty if the response indicates a high signal level from the first circuit and a high signal level from the second circuit.

16. The non-transitory computer-readable storage medium according to claim 13,
wherein in the first state of the manually operable input device, the manually operable input device is not actuated by the operator and propulsion of the vehicle as remotely operated by the operator from the remote driving station is not allowed,
wherein in the second state of the manually operable input device, the manually operable input device is actuated by the operator and propulsion of the vehicle as remotely operated by the operator from the remote driving station is allowed, and wherein the manually operable input device is adapted to automatically return from the second state to the first state when the operator stops actuating the manually operable input device.

17. The non-transitory computer-readable storage medium according to claim 13, wherein the challenge is configured to cause the input device control unit to apply a high signal level to the first circuit and a high signal level to the second circuit, and wherein the response allows the vehicle control unit to determine at least one of:

that the circuitry is faulty if the response indicates a low signal level from the first circuit and a low signal level from the second circuit;

that the manually operable input device is in the first state if the response indicates a high signal level from the first circuit and a low signal level from the second circuit;

that the manually operable input device is in the second state if the response indicates a low signal level from the first circuit and a high signal level from the second circuit; and that the circuitry is faulty if the response indicates a high signal level from the first circuit and a high signal level from the second circuit.

* * * * *